United States Patent
Takhim

(10) Patent No.: US 9,963,759 B2
(45) Date of Patent: May 8, 2018

(54) METHOD FOR RECOVERING ASH FROM WASTE INCINERATION

(71) Applicant: ECOPHOS S.A., Louvain-la-Neuve (BE)

(72) Inventor: Mohamed Takhim, Corroy-le-Grand (BE)

(73) Assignee: ECOPHOS S.A., Louvain-la-Neuve (BE)

( * ) Notice: Subject to any disclaimer, the term of this patent is extended or adjusted under 35 U.S.C. 154(b) by 23 days.

(21) Appl. No.: 15/104,444

(22) PCT Filed: Dec. 19, 2014

(86) PCT No.: PCT/EP2014/078736
§ 371 (c)(1),
(2) Date: Jun. 14, 2016

(87) PCT Pub. No.: WO2015/091946
PCT Pub. Date: Jun. 25, 2015

(65) Prior Publication Data
US 2016/0312333 A1    Oct. 27, 2016

(30) Foreign Application Priority Data

Dec. 20, 2013   (EP) .................................... 13199070

(51) Int. Cl.
*C22B 7/02* (2006.01)
*F23J 1/00* (2006.01)
(Continued)

(52) U.S. Cl.
CPC ............ *C22B 7/02* (2013.01); *B01D 11/0288* (2013.01); *B01D 15/361* (2013.01); *B09B 3/00* (2013.01);
(Continued)

(58) Field of Classification Search
CPC ..... C22B 7/02; B09B 3/0016; B09B 2220/06; B09B 3/0083; B09B 3/00; B09B 5/00;
(Continued)

(56) References Cited

U.S. PATENT DOCUMENTS 3,531,401 A * 9/1970 Crits ........................ B01J 49/05
                                                               210/677
5,451,382 A     9/1995 Vermaire et al.
(Continued)

FOREIGN PATENT DOCUMENTS

EP    0586910 A1   3/1994
EP    0743079 A1   11/1996
(Continued)

OTHER PUBLICATIONS

Sigma-Aldrich Safety Data Sheet Phosphorous acid, accessed online at http://www.sigmaaldrich.com/MSDS/MSDS/Display MSDSPage.do?country=US&language=en&productNumber= 215112&brand=SIGALD&PageToGoToURL=http%3A%2F% 2Fwww.sigmaaldrich.com%2Fcatalog%2FReplacement.do% 3FproductNumber%3D04114%26brand%3DSIAL%26matNo% 3D%26fromUrl%3Dhttp%253A%2F%2Fwww.sigmaaldric.*
(Continued)

*Primary Examiner* — Daniel C McCracken
(74) *Attorney, Agent, or Firm* — Norris McLaughlin & Marcus P.A.

(57) ABSTRACT

Methods treat ash from waste incineration, wherein the methods at least comprise: a) the digestion of the ash by a leaching liquor containing phosphate ions in solution such as to form a first solid phase comprising impurities and a first liquid phase comprising phosphate ions; and b) the separation of said first liquid phase comprising phosphate ions
(Continued)

from said first solid phase. Step a) is carried out for a duration of less than one hour or at a temperature of more than 40° C.

18 Claims, 1 Drawing Sheet

(51) Int. Cl.
| | |
|---|---|
| *B01D 15/36* | (2006.01) |
| *C05B 17/00* | (2006.01) |
| *B09B 3/00* | (2006.01) |
| *C05B 11/10* | (2006.01) |
| *B09B 5/00* | (2006.01) |
| *C05F 1/00* | (2006.01) |
| *C05F 3/00* | (2006.01) |
| *C05F 7/00* | (2006.01) |
| *B01D 11/02* | (2006.01) |
| *B01D 11/00* | (2006.01) |

(52) U.S. Cl.
CPC .......... *B09B 3/0016* (2013.01); *B09B 3/0083* (2013.01); *B09B 5/00* (2013.01); *C05B 11/10* (2013.01); *C05B 17/00* (2013.01); *C05F 1/005* (2013.01); *C05F 3/00* (2013.01); *C05F 7/00* (2013.01); *F23J 1/00* (2013.01); *B01D 2011/005* (2013.01); *B09B 2220/06* (2013.01); *F23J 2900/01007* (2013.01); *Y02A 40/203* (2018.01); *Y02A 40/205* (2018.01); *Y02A 40/213* (2018.01); *Y02P 10/212* (2015.11); *Y02P 20/145* (2015.11)

(58) Field of Classification Search
CPC .............. B01D 11/0288; B01D 15/361; B01D 2011/005; C05B 17/00; C05B 11/10; F23J 1/00; F23J 2900/01007; C05F 1/005; C05F 3/00; C05F 7/00; Y02P 10/212; Y02P 20/145
See application file for complete search history.

(56) References Cited

U.S. PATENT DOCUMENTS

| | | | |
|---|---|---|---|
| 5,521,132 A | 5/1996 | Talmy et al. | |
| 5,716,316 A | 2/1998 | Cartier et al. | |
| 6,027,543 A * | 2/2000 | Yoshizaki | C02F 11/004 210/724 |
| 6,132,355 A | 10/2000 | Derie | |

FOREIGN PATENT DOCUMENTS

| | | |
|---|---|---|
| EP | 0811580 A2 | 12/1997 |
| JP | H1133594 A | 2/1999 |
| JP | H1192122 A | 4/1999 |
| WO | 9731874 A1 | 9/1997 |
| WO | 2008115121 A1 | 9/2008 |

OTHER PUBLICATIONS

Lu, et al., Removal mechanism of phosphate from aqueous solution by fly ash, Journal of Hazardous Materials 2009; 161: 95-101.*

* cited by examiner

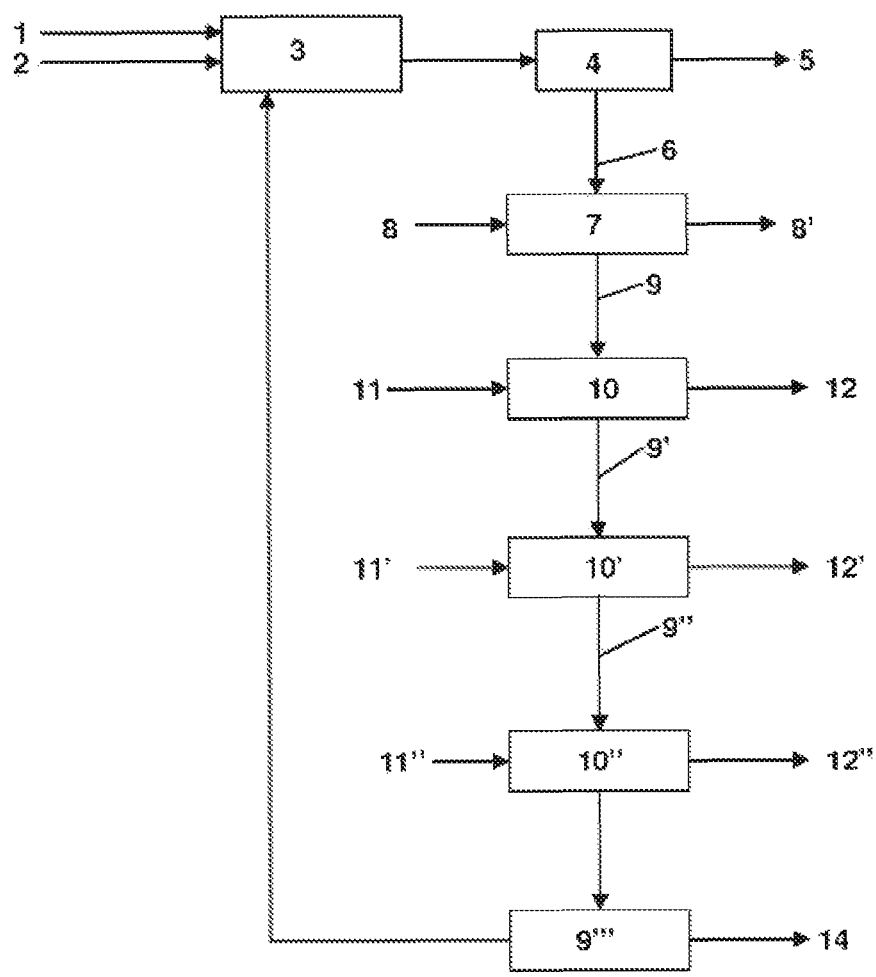

METHOD FOR RECOVERING ASH FROM WASTE INCINERATION

This application is a 371 application of PCT/EP2014/078736 filed Dec. 19, 2014, which claims foreign priority benefit under 35 U.S.C. 119 of European Application No. EP 13199070.7 filed Dec. 20, 2013.

TECHNICAL FIELD

This invention concerns the recovery of ash from waste incineration. In particular, this invention concerns the recovery of ash from the incineration of sludge from waste treatment plants, bones, manure or household waste.

TECHNOLOGICAL BACKGROUND OF THE INVENTION

Given the increasingly severe environmental and ecological constraints, the recovery of waste or residues, irrespective of their origin, has become all the more pertinent. Waste is generally incinerated to form two types of residues: solid non-combustible materials, called clinker or slag, containing high concentrations of pollutants such as heavy metals, which may be released when exposed to water; and residues from the smoke treatment, which are made up of ash from dust removal and smoke detoxification residues from the gas treatment. The recovery of these types of waste may be complex, depending on their composition. Some of these are used in construction or in the preparation of bituminous mixtures.

For example, U.S. Pat. No. 5,521,132 describes the recovery of ash via the production of ceramic materials. The ash is brought into contact with borax and a calcium compound, and is then heated to very high temperatures (approximately 1000° C.) to form ceramics.

EP 0 743 079 also describes the treatment of ash from waste incineration, which is used to stabilise the heavy metals in the ash. The ash is subjected to a phosphating reaction at very high temperatures (between 500° C. and 1200° C.) in order to transform the toxic metal chlorides into phosphate salts.

Moreover, WO 97/31874 mentions a method of making ash inert via its reaction with a phosphate mixture in order to form a paste that is fully carbonised at a temperature of more than 600° C. The resulting residue is mixed with water and a hydraulic binder such as cement.

These different processes mainly aimed at encapsulating or confining the heavy metals present in the ash, ceramics or cement, in order to prevent them from spreading in the environment. These processes therefore resulted in a significant increase in the mass of the waste, without adding to the value of their constituent elements, which are simply trapped in the cement or the ceramics before being disposed of in specific landfills.

In addition, JP H11-33594 shows us a process for treating sewage sludge via a phosphoric acid solution at a temperature of 40° C. This process is not optimal for purifying sewage sludge.

This invention seeks to overcome these drawbacks and recover at least a part of the constituents of the ash obtained from waste incineration.

SUMMARY OF THE INVENTION

This invention concerns a method for recovering ash from wet waste incineration. The ash is mainly obtained from the incineration of sludge from waste treatment plants, bones, manure or household waste.

This invention provides a method for treating the ash obtained from waste incineration, comprising:
  a) the digestion of ash by a leaching liquor containing phosphate ions in solution, which forms an first solid phase containing the impurities and an first liquid phase containing the phosphate ions,
  b) the separation of the said first liquid phase containing the phosphate ions and the said first solid phase.

The said first liquid phase is then isolated from the said first solid phase, which makes it easier to recover later. The said first liquid phase comprises the phosphate ions from the said leaching liquor, as well as metals in the form of metal ions or other elements originating from the ash. The solubilisation of these metals, which are initially present in the ash, will help in their subsequent treatment and recycling. In this way, this method allows recovering several metals that are present in the ash, by specifically extracting at least a part of them. Moreover, the final residue, i.e. the said first solid phase, can be used in the domains of construction. This invention provides a treatment method for ash that is more eco-friendly than known prior art processes. Effectively, this method consumes less energy as it does not include a high-temperature treatment step or a calcination step. Moreover, this method generates a significantly lesser amount of waste, since it allows extracting the constituents of the ash, which can later be used in specific recycling domains or directly as a solution for the market for diverse and varied applications (agriculture, food, construction, soil stabilisation, etc.)

Step a) can be executed at a temperature of between 20° C. and 95° C., ideally between 20° C. and 80° C., preferably between 50° C. and 80° C., and especially between 50° C. and 65° C.

Ideally, the said leaching liquor containing phosphate ions in solution has a weight percentage of phosphate ions between 1% and 85%, ideally between 7% and 55%, preferably between 7% and 50%, especially between 7% and 40%, and preferentially between 13% and 28% by weight of phosphate ions based on the total weight of the leaching liquor. The phosphate ions taken into consideration for determining the above weight percentage in phosphate ions are phosphate ions in the form $H_3PO_4$, $H_2PO_4$, $HPO_4^{2-}$ and $PO_4^{3-}$.

Preferably, the said leaching liquor containing phosphate ions in solution is a phosphoric acid solution, with greater preference given to an aqueous solution of phosphoric acid. The use of a leaching liquor containing phosphate ions, preferably an aqueous solution of phosphoric acid, allows improving the effectiveness of the extraction of the different elements (especially phosphorous, calcium, magnesium, aluminium or iron) present in the ash, and thereby reducing the number of steps to be implemented in the process. Preferably, the leaching liquor does not contain any acid in addition to the phosphoric acid. In fact, the presence of another acid will result in the production of other soluble or insoluble salts in the water. The removal of these salts, and their separation from the phosphate salts, will require additional liquid-liquid, chemical precipitation or mechanical separation extraction steps. Thus, the implementation, in step a), of a phosphoric acid solution as the leaching liquor allows optimising the number of steps in the process and thereby making it more economically viable.

The said separation, implemented in step b), can be executed by filtration. The filtrate recovered after the filtration corresponds to the first liquid phase containing phosphate ions, lacking any impurities that remain solid in the said first solid phase. The impurities that do not dissolve in the leaching liquor are then recovered in the said first solid phase and can be used as raw materials in the preparation of construction materials or soil stabilisation, or for any other application that requires a compound mainly comprising sand and gypsum. The residue has the advantage of being a stable residue, i.e. it is stable in leaching conditions and can therefore be used without negatively affecting the environment, e.g. in soil amelioration.

A BRIEF DESCRIPTION OF THE DRAWING

FIG. 1 shows a block diagram of the method according to a particular embodiment of this invention.

DETAILED DESCRIPTION OF THE INVENTION

This invention relates to a method for treating the ash obtained from waste incineration. As mentioned above, the ash can be obtained from the incineration of various kinds of waste. Nevertheless, the invention is particularly suited for ash originating from the incineration of sewage sludge, bones, manure or household waste; preferably for ash obtained from the incineration of sewage sludge, bones or manure. The ash may contain metal oxides or salts such as the metals from columns 1 to 16 of the periodic table of elements, including the rare earths, lanthanides and actinides, as well as the salts or oxides of the elements following Si, P, S, As. Preferably, the metals of columns 1 to 16 mentioned above can be Na, K, Li, Rb, Mg, Ca, Sr, Ba, Sc, Y, Ti, Zr, V, Nb, Cr, Mo, Mn, Fe, Ru, Co, Rh, Ni, Pd, Cu, Ag, Zn, Cd, Al, Ge, Sn, In, Sb, Pb or Bi. The method according to this invention allows extracting all or a part of these different metals or elements in the form of water-soluble phosphate salts. These salts can then be separated and recovered independently of each other. Thanks to the method according to this invention, even the said first solid phase recovered in step b) can be recovered and used as a raw material for other applications. Then, the ash treated by this process is no longer stored but used to preserve the environment and reduce the quantities of stored waste or landfills.

This method comprises the following steps:
a) the digestion of ash by a leaching liquor containing phosphate ions in solution, which forms an first solid phase containing the impurities and an first liquid phase containing the phosphate ions,
b) the separation of the said first liquid phase containing the phosphate ions and the said first solid phase.

After separation, the said first liquid phase containing phosphate ions can be recovered and/or isolated. In addition to phosphate ions, the first liquid phase can contain metal ions originating from metal oxides or salts such as the metals from columns 1 to 16 of the periodic table of elements, including the rare earths, lanthanides and actinides, or ions originating from the elements following Si, P, S, As. The metal ions may be ions originating from the following metals: Na, K, Li, Rb, Mg, Ca, Sr, Ba, Sc, Y, Ti, Zr, V, Nb, Cr, Mo, Mn, Fe, Ru, Co, Rh, Ni, Pd, Cu, Ag, Zn, Cd, Al, Ge, Sn, In, Sb, Pb or Bi. In particular, this method may allow extracting and thereby using all or a part of the aluminium, calcium, magnesium, iron, sodium, potassium, zinc, rare earths, copper, mercury, lead, phosphorous or any one of the metals mentioned above and contained in the ash.

The said leaching liquor containing phosphate ions in solution can have a weight percentage of phosphate ions between 1% and 85%, ideally between 7% and 55%, preferably between 7% and 50%, especially between 7% and 40%, and preferentially between 13% and 28% by weight of phosphate ions based on the total weight of the leaching liquor. Surprisingly, this method provides a high extraction efficiency (more than 80%) of one or more constituents of the ash, e.g. phosphorous, aluminium, calcium, magnesium or iron, when a leaching liquor containing phosphate ions in solution has a weight percentage of phosphate ions between 7% and 50%, especially between 7% and 40%, and preferentially between 13% and 28% by weight of phosphate ions based on the total weight of the leaching liquor.

Preferably, the leaching liquor containing phosphate ions in solution is preferably an aqueous solution of phosphoric acid. The said phosphoric acid solution used can be diluted, preferably in water, in order to obtain a leaching liquor having a weight percentage of phosphate ions between 1% and 85%, ideally between 7% and 55%, preferably between 7% and 50%, especially between 7% and 40%, and preferentially between 13% and 28% by weight of phosphate ions based on the total weight of the leaching liquor. The phosphoric acid solution can be diluted before, at the same time as or after it is brought into contact with the said ash treated in step a). Thus, a phosphoric acid solution (e.g. 85% by weight $H_3PO_4$) can be brought into contact with the ash and then a sufficient quantity of water is added to obtain a leaching liquor having a weight percentage of phosphate ions as mentioned above. Alternatively, a phosphoric acid solution (e.g. 85% by weight $H_3PO_4$) can be brought into contact with the ash simultaneously when a sufficient quantity of water is added to obtain a leaching liquor having a weight percentage of phosphate ions as mentioned above. Alternatively, a phosphoric acid solution (e.g. 85% by weight $H_3PO_4$) can be diluted with water to obtain a leaching liquor having a weight percentage of phosphate ions as mentioned above, and the said leaching liquor can then be added to the ash to implement step a) of this method.

Preferably, the leaching liquor containing phosphate ions in solution contains at least 50% by weight of phosphoric acid, ideally at least 75% by weight of phosphoric acid, preferentially at least 90% by weight of phosphoric acid, especially at least 98.5% by weight of phosphoric acid, and more particularly at least 99% by weight of phosphoric acid.

Preferably, the weight ratio between the said leaching liquor containing phosphate ions in solution and the ash can be greater or equal to 2, ideally greater than 4, preferentially greater than 5, and especially greater than 5.5. The weight ratio between the said leaching liquor containing phosphate ions in solution and the ash can also be between 2 and 100, ideally between 4 and 50, preferentially between 5 and 50, and especially between 5 and 25. The weight of ash to be taken into consideration is the weight of the ash before digestion, i.e. before it is brought into contact with the leaching liquor. This has the advantage of forming, in step a), a slightly viscous reaction medium in which the ash or the residues from the digestion are suspended. When the leaching liquor is a phosphoric acid solution, the weight of the leaching liquor is determined from the weight of the phosphoric acid solution used in step a), and optionally from the weight of the water added if the phosphoric acid solution is diluted. Thus, increases in mass or the formation of a viscous and mostly unusable paste are avoided. The separation executed in step b) is also made easier.

Preferably, before implementing step b), the weight ratio between the said first liquid phase containing phosphate ions and the ash is greater or equal to 2, ideally greater than 4, preferentially greater than 5, and especially greater than 5.5. The weight ratio between the said first liquid phase and the ash can also be between 2 and 100, ideally between 4 and 50, and preferentially between 5 and 25. The weight of ash to be taken into consideration is the weight of the ash before digestion, i.e. before it is brought into contact with the leaching liquor. Thus, the leaching liquor and the ash can temporarily form a paste or a slurry, but a sufficient quantity of water is added before implementing step b) of this method in order to obtain the weight ratio between the said first liquid phase and the ash mentioned above. The separation executed in step b) is also made easier and the recovery of the ash is improved.

Step a) of this method can be executed at a temperature between 20° C. and 95° C., ideally between 20° C. and 80° C., preferably between 50° C. and 80° C., and especially between 50° C. and 65° C. Implementing the digestion of the ash between 50° C. and 80° C. allows controlling the viscosity of the reaction medium and thereby prevents processing problems related to the leaching of the ash, and mainly increases in the mass of the reaction medium.

Step b) of this method can be executed at a temperature of between 20° C. and 95° C., and ideally between 20° C. and 80° C. Step b) of this method can be executed at a temperature of more than 40° C., preferably between 50° C. and 80° C., and especially between 50° C. and 65° C. The implementation of step b) of this method at a temperature of between 50° C. and 80° C. also improves the quality of the separation of phases, thereby improving the overall effectiveness of the method.

The ash is digested by the leaching liquor containing phosphate ions in solution for a duration of between 5 minutes and 8 hours, ideally between 5 minutes and 4 hours, and preferably between 5 minutes and 2 hours. Preferably, the ash is digested by the leaching liquor containing phosphate ions in solution for a duration of less than 1 hour, especially between 5 minutes and 45 minutes, and more particularly between 30 minutes and 45 minutes. Extremely impressive extraction results, e.g. >90% for phosphorous, are observed even when the duration of the digestion step is between 5 minutes and 2 hours, and ideally between 5 minutes and 45 minutes. This allows improving the economic and industrial viability of this method.

Ideally, this method is applicable to the treatment of ash originating from the incineration of sludge from treatment plants, bones or manure. Preferably, the ash treated by this process has a phosphorous content, expressed in percentage by weight of phosphates $PO_4$ in the ash, of at least 1%, ideally of at least 7%, preferably between 7% and 67.5%, especially between 7% and 47%, and more particularly between 20% and 47%. Phosphorous contents in the ash of at least 7% by weight of phosphates, preferably between 7% and 67.5%, especially between 7% and 47%, and more particularly between 20% and 47%, can be present in the ash originating from the incineration of sewage sludge, bones or manure.

Preferably, when the ash contains phosphorous, the absolute mass in phosphorous, expressed in g of $PO_4$, in the said first liquid phase containing phosphate ions obtained in step b) is greater than the absolute mass in phosphorous, expressed in g of $PO_4$, in the said leaching liquor containing phosphate ions in solution initially implemented in step a) of this method to digest the ash. Thus, the phosphorous contained in the ash is extracted and rendered soluble by the leaching liquor, which allows enriching the said first liquid phase in phosphates. Preferably, when the leaching liquor is a phosphoric acid solution, the said first liquid phase obtained in step b) is a phosphoric acid solution enriched in phosphates.

This process has a high extraction efficiency as regards at least a part of the metals contained in the ash, mostly in the form of water-soluble phosphate salts. E.g. at least 80%, ideally at least 90%, and preferably at least 95% of the calcium or magnesium present in the ash is digested in step a) and recovered in the said first liquid phase containing phosphate ions, which is obtained in step b). Similar values were also obtained for aluminium, iron and the other metals present in the ash. In particular, this method has a high extraction efficiency as regards the phosphorous contained in the ash, if any. At least 85%, ideally at least 90%, preferably at least 95%, and especially at least 98% of the phosphorous present in the ash is digested in step a) and recovered in the said first liquid phase in the form of phosphate ions.

The said first liquid phase containing phosphate ions, obtained in step b), can be recovered and may form a phosphoric acid solution. The said first liquid phase can be used as a raw material for the production of fertilisers. This may also contain metallic phosphate salts, such as aluminium phosphate, calcium phosphate, iron phosphate or magnesium phosphate. This phosphoric acid solution obtained in step b) can be used as is. Depending on the composition of the ash, the said first liquid phase can also contain sulphate salts such as aluminium sulphate, calcium sulphate, iron sulphate or magnesium sulphate.

According to a preferred embodiment, step a) of this method can be executed in a first co-current reactor comprising one or more compartments, ideally between 2 and 12 compartments, preferably between 2 and 5 compartments, and especially between 3 and 5 compartments. The compartments are arranged in series and communicate between themselves from their base. The ash and the leaching liquor containing phosphate ions can, for example, be introduced in a first compartment. The thus formed sludge then passes through each of the other compartments, which can thus be used to modulate or control the reaction time and thereby optimise the mixture of the compounds. The last compartment of the said first co-current reactor of step a) is connected to a device separating the first liquid phase and the first solid phase resulting from the step. Preferably, the first liquid phase and the first solid phase are separated using filtration. Thus, the last compartment of the said first co-current reactor of step a) is connected to a filter via a conduit, which allows transporting the reaction medium obtained at the end of step a) to the filter where step b) of this method shall be executed. Optionally, a buffer storage tank can be placed between the last compartment of the first co-current reactor used for implementing step a) and the filter used for implementing step b). In this case, the reaction medium obtained at the end of step a) is transferred from the buffer tank to the filter of step b).

This method may also include a step c) for the purification of the said first liquid phase containing phosphate ions obtained in step b), in order to form a second liquid phase containing phosphate ions. The purification of the first liquid phase containing phosphate ions allows significantly reducing the content of one or more metal ions present in the said first liquid phase and mentioned earlier, i.e. the metal ions originating from metals of columns 1 to 16 of the periodic table, preferably Na, K, Li, Rb, Mg, Ca, Sr, Ba, Sc, Y, Ti, Zr, V, Nb, Cr, Mo, Mn, Fe, Ru, Co, Rh, Ni, Pd, Cu, Ag, Zn, Cd, Al, Ge, Sn, In, Sb, Pb or Bi, or ions originating from the elements following Si, S, As; in particular, Ca, Mg, Fe, Al. The purification may also allow separating the different metal ions present in the said first liquid phase, in order to recover them independently of each other. According to a particular embodiment, the said second liquid phase can therefore be a purified phosphoric acid solution, i.e. a solution in which the contents of different metal ions such as calcium, magnesium, aluminium, iron or other metal ions can be reduced as compared to the contents of these ions in the said first liquid phase, with it also being possible for the latter to be a phosphoric acid solution according to a particular embodiment.

Step c) of purification can be a purification by liquid-liquid extraction. Thus, step c) of the said first liquid phase containing phosphate ions includes:
(i) extraction of the phosphate ions contained in the said first liquid phase with an organic solvent, in order to form an organic extraction phase containing phosphate ions and an aqueous extraction phase containing the impurities;
(ii) re-extraction of the said organic extraction phase by an aqueous re-extraction agent, in order to form an aqueous re-extraction phase and an organic phase with a low content of phosphate ions;
(iii) separation of the aqueous re-extraction phase containing phosphate ions and the organic phase, with the said aqueous re-extraction phase containing phosphate ions being the said second liquid phase.

The organic solvent is preferably chosen from the group consisting of methyl isobutyl ketone, butanol, pentanol, organic solvents in $C_4$ to $C_7$, and mixtures of the above. The purification step can also include, preferably before the extraction or re-extraction of the organic extraction phase containing phosphate ions, steps consisting of:
washing the said organic extraction phase containing phosphate ions with an aqueous solution in order to obtain a washed organic phase containing phosphate ions and an aqueous phase containing impurities and a certain quantity of phosphate ions;
separating the thus obtained washed organic phase containing phosphate ions. This organic phase is suitable for the said re-extraction. The purification by liquid-liquid extraction may also include a steam distillation of traces of organic extraction agent from the second liquid phase. Step c) of purification by liquid-liquid extraction may also include the addition of a strong acid to the said first liquid phase containing phosphate ions, which was obtained in step b) before the step (i) mentioned above. This allows increasing the extraction efficiency.

Alternatively, the purification of the said first liquid phase, executed in step c), can include the application of an exchange of ions to produce the said second liquid phase. As compared to a liquid-liquid extraction, purification by application of an exchange of ions provides a better yield in phosphate ions in the said second liquid phase. The application of an ion exchange can be executed using one or more ion-exchange resins, ideally cations or anions or a mixture, and preferably cations. Preferably, the ion-exchange resins include acid functional groups. In particular, the acid functional groups contained in the ion-exchange resins have a pKa less than the pKa of the acid-base pair, of which the conjugate base is formed by the phosphate ions obtained in step b). Ideally, the ion-exchange resins, preferably cations, include acid functional groups having a pKa that is less than the pKa of the $H_3PO_4/H_2PO_4^-$ pair. The application of an ion exchange may include the application of an anion-exchange resin in order to recover any arsenic oxides that may be generated during the implementation of this method.

The said one or more cation-exchange resins can be regenerated independently of each other via an acid solution, ideally hydrochloric acid, nitric acid or sulphuric acid. The said acid can be a strong acid. The regeneration of the ion-exchange resins produces an aqueous solution that contains the metal salts trapped by the resins. These salts can be chloride, nitrate or sulphate salts. Preferably, the said one or more cation-exchange resins can be regenerated independently of each other via a hydrochloric acid solution or a sulphuric acid solution, or a mixture of them. An aqueous solution containing one or more chloride salts or one or more sulphate salts or a mixture of the two may be formed. The salts may be metal chloride salts selected from among the metals of columns 1 to 16 of the periodic table (metals and transition metals, rare earths, As) or metal sulphate salts selected from among the metals of columns 1 to 16 of the periodic table (metals and transition metals, rare earths, As).

In general, the ash used in this method mainly contains calcium, magnesium, aluminium, iron, silicon or phosphorous in varying contents, depending on the origin of the ash. Silicon is mainly recovered in the said first solid phase. Preferably, phosphorous is recovered in the said first liquid phase or the said second liquid phase in the form of phosphoric acid. When the said one or more cation-exchange resins are regenerated independently of each other via a hydrochloric acid solution, an aqueous solution containing calcium chloride, magnesium chloride, aluminium chloride or iron chloride, or mixtures of them, is formed for each of the cation-exchange resins. These aqueous solutions can be recovered and isolated for later use in various technical domains, such as construction and the treatment of waste water in water purification plants. These aqueous solutions can also be dried and concentrated in order to obtain a commercial product. The salts can also be precipitated according to processes that are known to a person skilled in the art. This method is also applicable for recovering all or a part of the other metals present in the ash. This is made possible by multiplying the number of ion-exchange resins. Thus, aqueous solutions containing metal salts, such as Na, K, Li, Rb, Mg, Ca, Sr, Ba, Sc, Y, Ti, Zr, V, Nb, Cr, Mo, Mn, Fe, Ru, Co, Rh, Ni, Pd, Cu, Ag, Zn, Cd, Al, Ge, Sn, In, Sb, Pb or Bi, can be obtained during the regeneration of the said ion-exchange resins. This method therefore allows extracting all or a part of the different metals contained in the ash and recovering them, preferably in the form of chloride salt solutions. Alternatively, if the said ion-exchange resins are regenerated by a sulphuric or nitric acid solution, aqueous solutions of nitrate or sulphate salts are obtained instead of aqueous solutions of chloride salts.

This method thus allows recovering the ash as described in this invention, by mainly extracting all or a part of the aluminium, calcium, magnesium, iron or phosphorous present in it. Depending on the initial composition of the ash, other metals may be extracted and recovered. Preferably, phosphorous is recovered in the form of an aqueous solution of phosphoric acid. As mentioned above, all or a part of the aluminium, calcium, magnesium or iron can be recovered in the form of an aqueous solution of calcium chloride, aluminium chloride, magnesium chloride or iron chloride.

This method may also include a step for concentrating the said first liquid phase containing phosphate ions obtained or the said second liquid phase containing phosphate ions.

This method may also include a step of the activated carbon treatment of the said first liquid phase containing phosphate ions obtained in step b) or the said second liquid phase containing phosphate ions obtained in step c). This treatment allows removing all or a part of the dioxin or mercury that may be present in the said first liquid phase containing phosphate ions obtained in step b) or the said second liquid phase containing phosphate ions obtained in step c).

According to a particular embodiment of the invention, the said second liquid phase containing phosphate ions, obtained in step c), is a phosphoric acid solution. This can be obtained by using, in step a), a phosphoric acid solution as the leaching liquor containing phosphate ions in solution.

According to a preferred embodiment, a part of the said first liquid phase or the said second liquid phase containing phosphate ions is recycled for use in step a) as a leaching liquor containing phosphate ions in solution. The method can therefore be used continuously.

According to a particular embodiment of the invention, the leaching liquor is a phosphoric acid solution and this method may include:
a) the digestion of ash having a phosphorous content, expressed in percentage by weight of $PO_4$ in the ash, of at least 1% by a first phosphoric acid solution, in order to form a first solid phase containing the impurities and a first liquid phase containing phosphate ions, with the weight ratio between the said first phosphoric acid solution and the ash being greater or equal to 2, ideally greater than 4, and preferably greater than 5,
b) the separation of the said first liquid phase containing the phosphate ions and the said first solid phase,
b') optionally, the treatment of the first liquid phase containing phosphate ions using activated carbon,
c) purification of the said first liquid phase containing phosphate ions, preferably by the application of an ion exchange or by a liquid-liquid extraction, in order to obtain a second phosphoric acid solution,
c') optionally, the treatment of the said phosphoric acid solution using activated carbon. The weight of the said first phosphoric acid solution is determined by the weight of the phosphoric acid solution and the weight of the added water if the said first phosphoric acid solution is diluted before, during or after it is brought into contact with the ash. Preferably, the digestion is executed at a temperatures between 20° C. and 95° C., ideally between 20° C. and 80° C., preferably between 50° C. and 80° C., and in particular between 50° C. and 65° C.; and ideally for a duration of 5 minutes to 8 hours, ideally between 5 minutes and 4 hours, preferably between 5 minutes and 2 hours, in particular between 15 minutes and 45 minutes, and preferentially between 30 and 45 minutes. Preferably, the first phosphoric acid solution has a weight percentage of phosphate ions between 7% and 50%, especially between 7% and 40%, and preferentially between 13% and 28% by weight of phosphate ions based on the total weight of the first phosphoric acid solution. The phosphate ions taken into consideration for determining the above weight percentage in phosphate ions are phosphate ions in the form $H_3PO_4$, $H_2PO_4^-$, $HPO_4^{2-}$ and $PO_4^{3-}$.

According to another aspect of the invention, when the ash contains phosphorous, it can be used to increase the absolute mass in phosphates of an aqueous solution of phosphoric acid. In fact, by applying this method in which the leaching liquor containing phosphate ions in solution is a phosphoric acid solution, the said first liquid phase containing phosphate ions or the said second liquid phase containing phosphate ions obtained is a phosphoric acid solution in which the absolute mass in phosphates (in g of $PO_4$) was increased as compared to the absolute mass in phosphates in the leaching liquor (in g of $PO_4$).

This method can be applied to ash that mainly contains aluminium, iron, calcium or magnesium or their mixtures, and little phosphorous (less than 1% by weight of $PO_4$). In this case, the said first liquid phase will contain aluminium, calcium, iron or magnesium phosphate salts or their mixtures. The implementation of step c) of purification, for example by the application of ion exchanges or by liquid-liquid extraction, will allow recovering a second liquid phase containing phosphate ions in solution, e.g. a phosphoric acid solution if the leaching liquor used in step a) was a phosphoric acid solution. Moreover, the regeneration of the ion-exchange resins will allow recovering mainly aqueous solutions of aluminium, calcium, magnesium or iron salts or mixtures of them, and possibly other aqueous solutions of metal salts originating from the metals that may be present in the ash, such as Na, K, Li, Rb, Sr, Ba, Sc, Y, Ti, Zr, V, Nb, Cr, Mo, Mn, Ru, Co, Rh, Ni, Pd, Cu, Ag, Zn, Cd, Ge, Sn, In, Sb, Pb or Bi.

FIG. 1 shows a block diagram of the method according to a particular embodiment of this invention. The ash 1 and a phosphoric acid solution 2 is fed into the digestion reactor 3. After digesting the ash 1 according to the conditions of this method, the reaction medium is subjected to filtration via a filter press 4 in order to separate the first solid phase 5 from the first liquid phase 6 containing phosphate ions in solution. The first liquid phase is treated in 7 with activated carbon 8. The solid residue resulting from this treatment is removed in 8' and the liquid phase 9 resulting from this treatment is treated with 3 cation-exchange resins, 10, 10' and 10", placed in series. The number of cation-exchange resins is limited to 3 in this example for the purpose of clarity and conciseness; in practice, at the industrial level, the number of cation-exchange resins can be increased, for example between 20 and 100 cation-exchange resins depending on the degree of purity of the said second liquid phase and the number of metals to be recovered. The liquid phases 9', 9" and 9''' correspond to the liquid phases at the output of the corresponding cation-exchange resin. The liquid phases 9', 9" and 9''' are phosphoric acid solutions, the purity of which is improved as and when they are passed through the cation-exchange resins. All or a part of the phosphoric acid solution obtained in 9''' can be recovered or stored in 14 or recycled to supply the digestion reactor 3. The ion-exchange resins 10, 10', 10" are regenerated independently of each other, via a hydrochloric acid solution 11, 11' or 11". The aqueous solution 12 recovered after the regeneration of the exchange resin 10 mainly contains calcium chloride or magnesium chloride or a mixture of the two. The aqueous solutions 12' and 12" recovered after the regeneration of the exchange resin 10' and 10" mainly contain aluminium chloride or iron chloride or a mixture of the two.

Procedure Used to Determine the Metal Contents

The metal contents in a sample are determined using optical emission spectrometry (ICP-OES: Inductively coupled plasma optical emission spectrometry) using an Agilent 710 Axial series ICP optical emission spectrometer equipped with a nebuliser (One Neb insert concentric ICP) and a plasma torch (lo-flw, Quartz, inlet tbg, axial). The samples and standards are prepared in containers that were cleaned beforehand with a diluted nitric acid solution (193 g of nitric acid at 96%, diluted till 1000 mL with distilled water). The equipment is calibrated using the following protocol, using the standard solutions of $Pb(NO_3)_2$ with a lead concentration of 100 mg/L, of $Cd(NO_3)_2$ with a cadmium concentration of 100 mg/L, of $Hg(NO_3)_2$ with a mercury concentration of 100 mg/L, of $H_3AsO_4$ with an arsenic concentration of 100 mg/L, and of $Y(NO_3)_3$ with a yttrium concentration of 100 mg/L. From each of the solutions of $Pb(NO_3)_2$, $Cd(NO_3)_2$, $Hg(NO_3)_2$ and $H_3AsO_4$, a series of 7 samples with calibrations of 0.01 ppm, 0.05 ppm, 0.1 ppm, 0.5 ppm, 1 ppm and 5 ppm are prepared. In each sample, 200 μL of the standard solution of $Y(NO_3)_3$ is added and then each sample is diluted with the above diluted nitric acid solution, until a volume of 100 mL is obtained. The samples to be analysed by ICP-OES are prepared by mixing 10 g of the sample to be analysed and 200 μL of the standard solution of $Y(NO_3)_3$ in a 100 mL phial containing 50 mL of the diluted nitric acid solution, as prepared above. The volume is then adjusted to 100 mL by adding the diluted nitric acid solution. The thus obtained solution is shaken vigorously.

Example 1

A leaching liquor is prepared, containing a phosphoric acid solution at 20.7% by weight of phosphate ions, from 481.1 g of a phosphoric acid solution at 85% by weight of $H_3PO_4$ and 1510.1 g of water. In a digestion reactor, 100 g of ash originating from the incineration of sludge from water purification plants is brought into contact with the phosphoric acid solution at 20.7% by weight of phosphate ions, as prepared above. The ash contains 36.2% of phosphorous (expressed in percentage % by weight in the form of $PO_4$). The ash is digested for 30 minutes at 60° C. The reaction mix is filtered on a filter press. The filtrate is purified by applying 6 cation-exchange resins (Lewatit® S2568H-Lanxess) arranged in series. The aqueous solution of phosphoric acid recovered at the output of the sixth cation-exchange resin contains 98% of the phosphates initially present in the digestion reactor, i.e. of the phosphates initially present in the ash and in the leaching liquor. This phosphoric acid solution is concentrated in order to obtain a solution at 54% by weight of $P_2O_5$. The application of cation-exchange resins allows purifying the phosphoric acid solution. The above table 1 summarises the different metal contents that are in the phosphoric acid solution before purification and at the output of each of the ion-exchange resins.

tents are significantly reduced. The different columns were regenerated independently of each other, via a hydrochloric acid solution at 5%. The aqueous solutions recovered after the regeneration of columns 1 and 2 comprise magnesium chloride, calcium chloride, iron chloride and aluminium chloride. The aqueous solutions recovered after the regeneration of columns 3 to 6 mainly contain iron chloride and aluminium chloride.

Example 2

Example 1 was reproduced using phosphoric acid solutions of different concentrations for digesting the ash. Four phosphoric acid solutions, respectively at 9.9% by weight of phosphate ions, 13.8% by weight of phosphate ions, 27.6% by weight of phosphate ions, and 34.5% by weight of phosphate ions, were prepared using a phosphoric acid solution at 85% by weight of $H_3PO_4$.

TABLE 2 results of the digestion of the ash by phosphoric acid solutions of different concentrations

| Example | Ash (g) | weight % in phosphate ions in the leaching liquor | weight % in phosphate ions in the filtrate | Efficiency (%) |
|---|---|---|---|---|
| 2A | 100 | 9.9 | 11.1 | 90 |
| 2B | 100 | 13.8 | 15.4 | 95.5 |
| 2C | 100 | 20.7 | 22.2 | 98 |
| 2D | 100 | 27.6 | 29.0 | 99 |
| 2E | 100 | 34.5 | 36.6 | 98 |

As shown by the results summarised in table 2, the phosphate content in the solution obtained after filtration (after step b) of this method) is greater than the phosphate content of the leaching liquor. The phosphorous present in the ash has been extracted and recovered in the form of a phosphoric acid solution. The efficiency, mentioned in table 2, corresponds to the quantity of phosphates recovered in the filtrate of step b) of this method, as compared to the quantity

TABLE 1

Metal content (ppm) in the phosphoric acid solution

| Metals | Ash | Before purification | $1^{st}$ column | $2^{nd}$ column | $3^{rd}$ column | $4^{th}$ column | $5^{th}$ column | $6^{th}$ column |
|---|---|---|---|---|---|---|---|---|
| Al | 39000 | 1101 | 915 | 426 | 152 | 73 | n.d. | 41 |
| As | 32 | 1.6 | 1.56 | 1.73 | 1.67 | 1.75 | 1.64 | 1.78 |
| Ca | 78000 | 4048 | 275 | 39 | < | < | < | < |
| Cd | 2 | 0.5 | < | < | < | < | < | < |
| Cr | 90 | 4.2 | 3.74 | 3.81 | 3.23 | 2.96 | 2.53 | 2.5 |
| Fe | 110000 | 2144 | 1942 | 1758 | 1588 | 1475 | 1143 | 1009 |
| K | 13200 | 897 | 92 | 43 | 10 | 2 | n.d. | n.d. |
| Mg | 14100 | 1012 | 193 | 8 | 1 | < | < | < |
| Mn | 1456 | 73 | 15 | 1 | 0.1 | < | < | < |
| Mo | 17 | 1.4 | 1.35 | 1.5 | 1.43 | 1.48 | 1.49 | 1.61 |
| Na | 3600 | 229 | 45 | < | < | < | < | < |
| Ni | 126 | 4.9 | 0.6 | < | < | < | < | < |
| Pb | 169 | 12 | 1 | 0.35 | < | < | < | < |
| Sr | 454 | 29 | 1.45 | 0.12 | < | < | < | < |
| Zn | 1598 | 100 | 14.5 | 0.1 | < | < | < | < |
| Si | 140000 | <250 | n.d. | n.d. | n.d. | n.d. | n.d. | n.d. |

* the symbol "<" indicates that the content is lower than the detection threshold.

The application of ion-exchange resins, preferably of cations, allows removing a part of the metals present in the phosphoric acid solution obtained after step b) of this method. The magnesium, calcium, aluminium or iron conof phosphates present initially, i.e. in the ash and in the leaching liquor. This efficiency is excellent when the ash is digested in the leaching liquor used in examples 2C, 2D or 2E.

Example 3

Ash (100 g) mainly containing 18.1% by weight of silicon, 8.7% by weight of aluminium, 15.7% by weight of calcium, 2.3% of iron, 1.5% by weight of magnesium, was treated with 1992 g of a phosphoric acid solution (20.7% by weight of phosphate ions) at 60° C. for 45 minutes. The ash contained less than 1% by weight of phosphorous (expressed in % by weight of $PO_4$). The reaction medium is filtered by a filter press. The liquid phase is purified by the application of 5 ion-exchange resins placed in series (Lewatit® S2568H-Lanxess). A phosphoric acid solution with low contents of metal ions is recovered after this purification. The ion-exchange resins were regenerated with a hydrochloric acid solution at 5% and five aqueous solutions were recovered. The extraction efficiencies for aluminium, calcium, magnesium and iron were respectively 95%, 98%, 98% and 81%.

The invention claimed is:

1. A treatment method for ash from waste incineration, comprising:
    a) digesting ash by a leaching liquor containing phosphate ions in solution, which forms a first solid phase containing the impurities and a first liquid phase containing the phosphate ions, and
    b) separating the said first liquid phase containing phosphate ions and the said first solid phase,
    wherein the ash is digested in a) by the leaching liquor containing phosphate ions in solution for a duration of between 5 minutes and 45 minutes and at a temperature of more than 40° C., and wherein the ash before a) has a phosphorous content, expressed in weigtht percentage of phosphates in the form of $PO_4$, between 7% and 67.5%.

2. The method according to claim 1, further comprising: c) for the purification of the said first liquid phase containing phosphate ions, in order to form a second liquid phase containing phosphate ions, with the said purification being executed by liquid-liquid extraction or by the application of ion exchange.

3. The according to claim 1, wherein the weight ratio between the said leaching liquor containing phosphate ions in solution and the ash is greater or equal to 2.

4. The method according to claim 1, wherein said leaching liquor containing phosphate ions in solution has a weight percentage of phosphate ions between 1% and 85%, based on the total weight of the leaching liquor.

5. The method according to claim 1, wherein the leaching liquor containing phosphate ions in solution is an aqueous solution of phosphoric acid.

6. The method according to claim 1, wherein the ash is digested in a) by the leaching liquor containing phosphate ions in solution for a duration of between 30 minutes and 45 minutes.

7. The method according to claim 1, wherein the ash is digested in a) by the leaching liquor containing phosphate ions in solution at a temperature between 50 and 80° C.

8. The method according to claim 1, wherein the leaching liquor containing phosphate ions in solution is a solution containing at least 98.5% by weight of phosphoric acid.

9. The method according to claim 1, wherein the phosphorous content, expressed in weight percentage of phosphates in the form of $PO_4$, of the ash before a) is between 7% and 47%.

10. The method according to claim 9, wherein at least 85% of the phosphorous present in the ash is digested in a) and recovered in the said first liquid phase in the form of phosphate ions, obtained in b).

11. The method according to claim 1, wherein a) is executed in a co-current reactor comprising between 2 and 12 compartments.

12. The method according to claim 2, wherein c) is executed by the application of an ion exchange, by using one or more ion-exchange resins.

13. The method according to claim 12, wherein, if at least two ion-exchange resins are utilized, the at least two ion-exchange resins are regenerated independently of each other via an acid solution.

14. The method according to claim 13, wherein the acid of the acid solution is hydrochloric acid or sulphuric acid or a mixture of the two, and one or more aqueous solutions containing chloride salts or sulphate salts or a mixture of the two are recovered during the regeneration of the said ion-exchange resins.

15. The method according to claim 2, wherein said second liquid phase containing phosphate ions obtained in c) is a phosphoric acid solution.

16. The method according to claim 1, wherein a part of the said first liquid phase containing phosphate ions or the said second liquid phase containing phosphate ions is recycled for use in a) as a leaching liquor containing phosphate ions in solution.

17. A method for treating ash from waste incineration that consists of:
    a) digesting ash, originating from the incineration of sewage sludge, bones or manure, having a phosphorous content, expressed in percentage by weight of $PO_4$ in the ash, of at least 1%, by a first phosphoric acid solution, in order to form a first solid phase containing the impurities and a first liquid phase containing phosphate ions, with the weight ratio between the said first phosphoric acid solution and the ash being greater or equal to 2, wherein the said first phosphoric acid solution has a weight percentage in phosphate ions between 7% and 55% by weight of phosphate ions based on the total weight of the leaching liquor, wherein the digesting is executed for a duration between 5 minutes and 45 minutes, at a temperature between 50° C. and 65° C.;
    b) separating said first liquid phase containing the phosphate ions and the said first solid phase,
    b') optionally, treating the first liquid phase containing phosphate ions using activated carbon,
    c) purifying said first liquid phase containing phosphate ions, by the application of an ion exchange or by a liquid-liquid extraction, to obtain a second phosphoric acid solution,
    c') optionally, treating said phosphoric acid solution using activated carbon.

18. The method according to claim 4, wherein said leaching liquor containing phosphate ions in solution has a weight percentage of phosphate ions between 7% and 55%, based on the total weight of the leaching liquor.

* * * * *